United States Patent [19]
Langbakk et al.

[11] Patent Number: 5,868,207
[45] Date of Patent: Feb. 9, 1999

[54] AGRICULTURAL IMPLEMENT HAVING A SET OF GROUND WORKING TOOLS

[75] Inventors: Hans P. Langbakk; Torstein Salte, both of Kvernaland, Norway

[73] Assignee: Kverneland Klepp AS, Kverneland, Norway

[21] Appl. No.: 737,972

[22] PCT Filed: Mar. 12, 1996

[86] PCT No.: PCT/GB96/00569

§ 371 Date: Nov. 27, 1996

§ 102(e) Date: Nov. 27, 1996

[87] PCT Pub. No.: WO96/29852

PCT Pub. Date: Oct. 3, 1996

[30] Foreign Application Priority Data

Mar. 29, 1995 [GB] United Kingdom .................... 9506469

[51] Int. Cl.⁶ ............................... A01B 63/11; A01C 7/20
[52] U.S. Cl. ......................... 172/274; 172/321; 172/464; 111/59
[58] Field of Search ...................... 172/272, 274, 172/321, 395, 411, 423, 424, 439, 448, 464, 487, 4, 7, 11, 12, 239, 260.5, 261, 263, 264, 611, 669, 677, 678, 684.5, 776; 111/52, 59, 200

[56] References Cited

U.S. PATENT DOCUMENTS

| | | | |
|---|---|---|---|
| 3,570,153 | 3/1971 | Guinot | 172/321 X |
| 3,905,425 | 9/1975 | Jackson | 172/321 |
| 4,920,732 | 5/1990 | Lee et al. | 172/321 X |
| 5,065,681 | 11/1991 | Hadley | 172/464 X |

FOREIGN PATENT DOCUMENTS

| | | |
|---|---|---|
| 0632953 | 1/1995 | European Pat. Off. . |
| 2521817 | 8/1983 | France . |
| 3607257 | 9/1987 | Germany . |
| 2105966 | 4/1983 | United Kingdom . |
| 2128066 | 4/1984 | United Kingdom . |

*Primary Examiner*—Christopher J. Novosad
*Attorney, Agent, or Firm*—Sheridan Ross P.C.

[57] ABSTRACT

An agricultural implement is towed behind a tractor or other propelling vehicle and is mounted on a lifting mechanism at the rear of such vehicle so that the forward part of the implement is supported by such mechanism. In one embodiment the agricultural implement includes a seed drill that introduces seeds into the ground at a substantially constant depth below ground level, despite possible undulation in the surface profile of the field which is being seeded.

11 Claims, 10 Drawing Sheets

AGRICULTURAL IMPLEMENT HAVING A SET OF GROUND WORKING TOOLS

FIELD OF THE INVENTION

This invention relates to an agricultural implement which is intended to be towed behind a tractor or other propelling vehicle, and to be mounted on a lifting mechanism at the rear of the vehicle so that the forward part of the implement is supported by said mechanism.

BACKGROUND OF THE INVENTION

The invention has been developed primarily in connection with an agricultural implement of the fully mounted type, but it may also be applied to an implement of the semi-mounted type in which the forward part of the implement is supported by the lifting mechanism at the rear of the propelling vehicle, whereas further parts of the implement are supported by ground wheels. The main implement of this type to which the invention may be applied, with particular advantage, is a direct drilling implement (a seed drill), in which it is important to ensure, as far as possible, that the seed is introduced into the ground at a substantially constant depth below ground level, despite possible undulation in the surface profile of the field which is being drilled.

A direct drilling implement is capable of introducing seed directly into unprepared ground. It is not necessary to plough or work the soil before the drilling machine is used. Therefore, to achieve direct drilling on unprepared ground, the implement normally has disks mounted at its front end, and immediately behind them are grubber tines which cut down into the ground and loosen the top layer of the soil down to the depth where the seed is to be introduced. The machine also has rollers at the rear end of the machine which press and pack the loose soil over the seed, after introduction into the ground.

Depth control of the machine is usually carried out by use of depth wheels. The purpose of these wheels is to prevent the tools which loosen the soil from penetrating too deeply into the ground. However, when the soil is hard, the working tools of existing implements do not have sufficient force to penetrate deeply into the ground. The seed drills are usually mounted on a second frame, which is pivotally connected to the main frame. This second frame is pressed down onto the ground surface by a number of springs, and such springs have to be strong enough to hold the second frame in position. The rollers at the rear end of the implement prevent the second frame, with its seed drills, from penetrating too deeply. The seed drills are usually positioned on tines that are resiliently connected to the second frame.

Therefore, in existing machines, depth control is achieved by use of the main depth wheels, and the rear rollers hold the implement in a required position. However, it is a matter of practical experience that existing machines are not always capable of maintaining the seed drills at a required depth, owing to variable hardness of the ground surface and/or variable undulation in the ground surface.

Failure to maintain a substantially constant drilling depth will result in uneven germination of the seed, or possibly no germination at all at certain parts of the field.

Given that the ground level of most fields has a varying profile e.g. undulating in the form of successive humps and hollows (and together with varying ground hardness causing variable penetration by the grubber tines etc), it is difficult to maintain a substantially constant depth of drilling using existing implements, in that a tractor/implement combination will tend to oscillate (in a vertical plane) during transit across a field, and which tends to result in the height of the "seed drills" varying out of phase with this oscillation, resulting in variation in the height of the seed drill relative to the immediately underlying ground surface, with resulting variation in depth of introduction of seed into the ground.

At the very least, this can result in different rates at which the germinated seed pushes upwardly through the ground surface, and at the worst results in a total failure of the seed to germinate.

SUMMARY OF THE INVENTION

The invention therefore addresses this problem and seeks to provide a solution by means of a novel design of mounting assembly at the front end of the implement, which assists in transfer of downward load from the rear of the propelling vehicle (tractor) through the mounting assembly and to a main frame of the implement, and which frame then applies a continuous downward loading force to the seed grubber tines and/or the drills.

By such an arrangement, the drilling depth can be maintained at a substantially constant level below the ground surface, and even when an undulating ground surface (or unduly hard ground) is being traversed by the trailed combination of tractor and implement.

According to the invention there is provided a towable agricultural implement having a set of ground-working tools which are required to penetrate and to be pulled through the ground at a controllable depth, said implement comprising:

a main frame on which said tools are mounted directly or indirectly;

a mounting assembly at the forward end of the main frame and adapted to be mounted on a lifting mechanism of a propelling vehicle, said mechanism comprising a fixed top link and a pair of lower links which are adjustable upwardly and downwardly in order to control the height of the forward end of the implement, and said mounting assembly comprising a pair of mounting brackets mounted on the main frame and engageable each with a respective one of said lower links of the lifting mechanism; and, a weight transfer mechanism which forms part of said mounting assembly and which is operative to transfer part of the weight of the propelling vehicle to said main frame in order to increase the downward loading applied to the ground-working tools:

characterised in that the weight transfer mechanism comprises:

1. a lever arm which is adapted to be coupled at one end A with said top link of the lifting mechanism, and at its other end C to be supported by an upstanding frame which forms part of said mounting assembly;

2. a weight transfer device is coupled at its lower end D with said main frame and is coupled at its upper end with said lever arm so as to have a line of action passing through the lever arm at a location B closer to said one end A than to said other end C of the lever arm, whereby the downward force $F_1$ applied through the weight transfer device, and derived from the weight of the propelling vehicle, is much greater than the upward force $F_2$ applied at said other end C of the lever arm to the support frame, so that a net downward force $(F_1-F_2)$ is transferred to the main frame in order to apply a downward biasing force to the ground working tools.

With such a novel arrangement of mounting assembly in an agricultural implement according to the invention, it is possible to maintain a substantially constant working depth of said tools below the ground surface, despite possible undulation in the ground surface over which the combination is moving, and/or variation in resistance of the ground conditions.

Preferably, the agricultural implement comprises a direct drilling implement, in which case the soil working tools comprise grubber tines and/or seed drills. However, it should be understood that the features of the invention, and the technical advantages obtained thereby, may be applied to other types of agricultural implement of the fully-mounted type, and in which it is desirable to maintain a substantially constant depth of soil working tools below the ground surface.

Preferably, the mounting assembly comprises a rigid front frame secured to the main frame of the implement and adapted to be pivotally connected at its lower end to the lower draft links of the towing vehicle and having an adjustable link for interconnecting the upper end of the front frame to the fixed upper link of the vehicle. The ground wheels of the implement are arranged to be adjustable to set the required working depth of the working tools, and the link interconnecting the upper end of the front frame to the fixed upper link of the vehicle can be adjusted to vary the angle of the main frame relative to the ground.

The adjustable link may have a coarse adjustment and a fine adjustment facility, and preferably formed by a connecting bracket at the upper end of the front frame and having a number of different mounting holes to which the link may be connected for coarse adjustment, and the link itself being adjustable in length e.g. formed by a telescopic ram or turnbuckle, for fine adjustment.

To provide weight transfer from the towing vehicle (tractor) to the implement via the mounting assembly, preferably the mounting assembly includes an actuator rod which is adjustable between an inoperative mode and an operative mode (in which it is effective to apply a biasing force), and an actuator arm coupled with said actuator rod and with said main frame so as to be capable of transmitting said biasing force as a downward force on the main frame and thereby to the soil working tools.

The actuator rod may be arranged to be biased by any suitable means, but preferably utilize a compression spring which is effective, in the operative mode, to apply the biasing force to the actuator arm.

The actuator rod may be adjusted between its two modes by a toggle linkage, which preferably comprises a crank actuator to which the actuator rod is pivotally connected, and which crank is pivotally adjustable between an inoperative mode in which the actuator rod has an idle connection to the actuator arm, and an operative mode in which the line of action of the actuator rod passes through, or close to the pivot axis of the crank.

A four arm linkage is preferably provided, to control the application of the biasing force to the main frame of the implement, and in which two arms of the linkage are formed by the actuator arm and the actuator rod, when the latter is in the operative mode. The two remaining arms of the linkage may be formed by an upright frame component which is pivotally connected at its lower end to a pair of mounting brackets by which the implement can be coupled pivotally to the lower draft links of the towing vehicle, and which is pivotally connected at its upper end to a lever arm which is pivotally connected at its end remote from the upright frame component to the fixed top link of the towing vehicle.

BRIEF DESCRIPTION OF THE DRAWINGS

Preferred embodiments of towable agricultural implement according to the invention will now be described in detail, by way of example only, with reference to the accompanying drawings, in which:

FIG. 9 is a schematic illustration of the lifting mechanism of the tractor and the modified coupling assembly/weight transfer mechanism of FIG. 8;

DETAILED DESCRIPTION OF THE INVENTION

Figure 1:
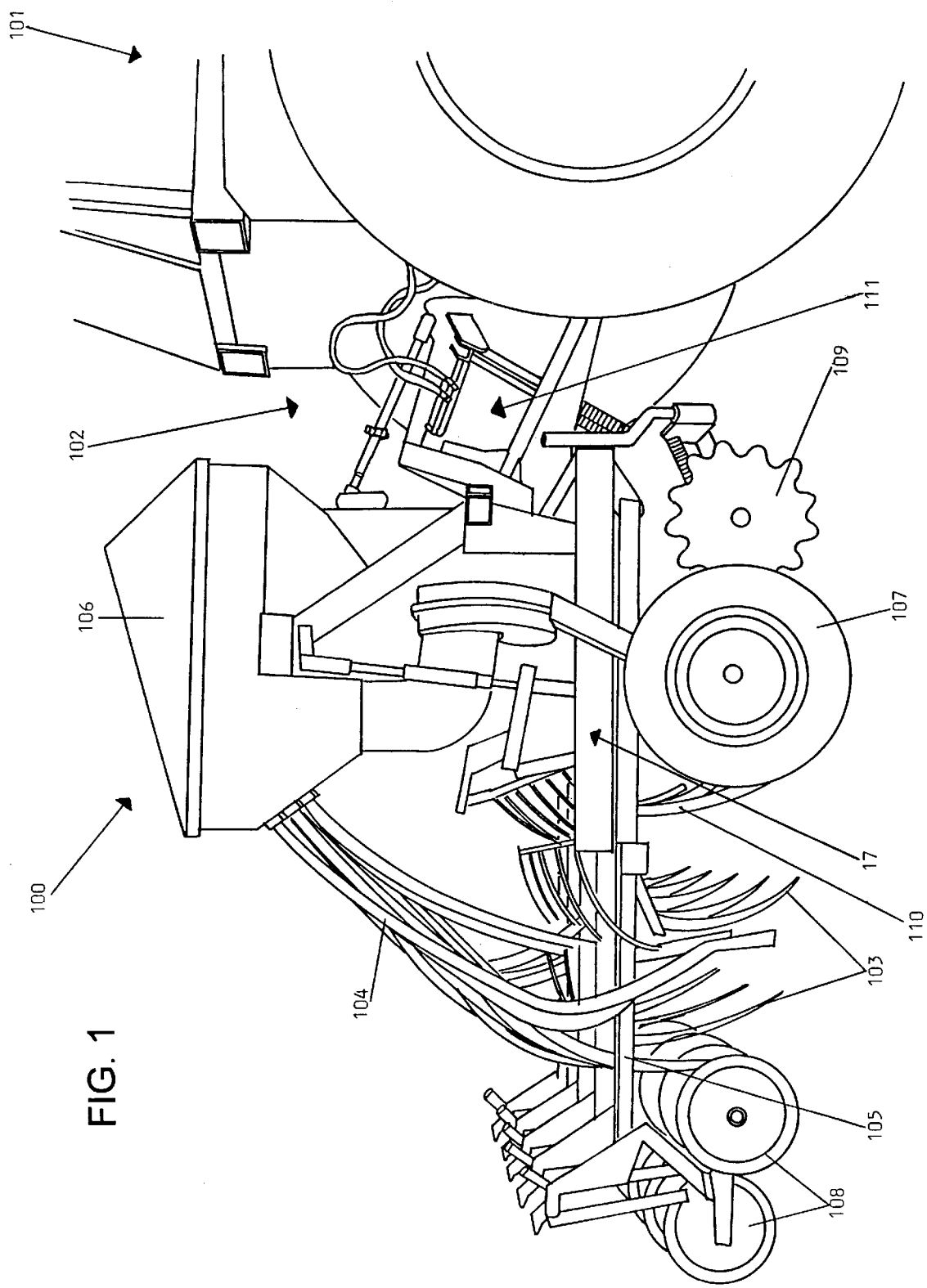
FIG. 1 is a side view of a first embodiment of implement which is fully-mounted on the lifting mechanism at the rear of a propelling vehicle (tractor), and taking the form of a direct drilling machine.

Referring to the general side perspective view of FIG. 1, there is shown a towed direct drilling machine 100 which is fully-mounted at the rear of an agricultural tractor 101, via the usual lifting mechanism 102 at the rear of the tractor, namely a pair of lower draft links which are upwardly and downwardly adjustable under hydraulic action, in well-known manner, and which also are capable of "floating" for use in connection with certain types of implement. There is also a fixed upper link of the lifting mechanism, to which the implement also is connected. It should be understood that a direct drilling machine is merely one example of a fully-mounted agricultural implement to which the invention may be applied, and of course while a tractor will be the usual towing vehicle which is employed, it should be understood that any other type of propelling vehicle may be utilised if required.

It should be understood that, possibly with some modification, the invention may be applied also to agricultural implements of the semi-mounted type.

The agricultural implement shown in FIGS. 1 to 6 is a direct drilling machine, having a main frame 17, a mounting assembly forming a rigid part of the main frame and mounted at the forward end of the implement, seed drills 103 mounted on a secondary frame 105 which is pivotally connected to the main frame 17 and projecting downwardly to extend to a controlled depth below the surface of the ground which is being drilled, a seed hopper 106 mounted on the main frame and having distribution tubes 104 running to just behind the seed drills 103, in well-known manner, and ground wheels 107 supporting at least part of the weight of the main frame and which are upwardly and downwardly adjustable to vary the working depth of the seed drills. Rear packer wheels or rollers 108 press and pack the loose soil over the introduced seed.

It is an important aspect of the mounting assembly at the front of the implement that it can be coupled to the lower lifting arms (links) and to the fixed top link of a three point lifting mechanism at the rear of a tractor, without need to carry out any adaptation or modification of the lifting mechanism, i.e. the mounting assembly is a universal-type of assembly which allows the implement to be coupled readily with tractors of different manufacturers.

The direct drilling machine shown in FIGS. 1 to 6 of the drawings is arranged to introduce seed directly into unprepared ground i.e. ground which has not yet been ploughed or worked in any way before the machine is used. To achieve this, disks 109 are mounted at the front of the implement, and there follow behind them grubber tines 110 which penetrate the ground and loosen the top layer down to a depth at which the seed is to be introduced. The rollers 108 at the rear end of the machine press and pack the loose soil over the introduced seed.

Depth control is achieved by use of the depth wheels 107 which prevent the tools 103 that loosen the soil from penetrating too deeply. As will be described in more detail below with reference to FIG. 2 of the drawings, a weight transfer mechanism is provided to transfer load from the tractor to the working tools of the implement, to provide sufficient downward force to hold the tools at the required depth of penetration into the soil. This is necessary because, if the soil is too hard, the working tools of the implement may not have sufficient force to penetrate the ground, or to penetrate the ground to a required depth.

The seed drills are usually mounted on secondary frame 105, pivotally connected to the main frame 17, and such second frame being pressed down against the ground surface by a number of springs. These springs have to be strong enough to hold the second frame in position. The rollers at the rear end of the implement prevent the second frame, with the drills, from going too deep. The seed drills are usually positioned on tines that are resiliently connected to the secondary frame.

Therefore, depth control is carried out by use of the main wheels, and the rollers, to hold the implement in a required position. To ensure that the implement stays in this position, during traversing across a field, reliance is placed upon the weight of the implement itself, and the weight transfer mechanism (to be described below) for transferring weight from the tractor. In addition there are springs incorporated in the weight transfer mechanism, between the main and second frame, and on all of the soil working tools, such as coulters, tines and drills. This enables different parts of the implement to deflect when obstacles are met e.g. large stones, that are too resistant to move.

Figure 2:
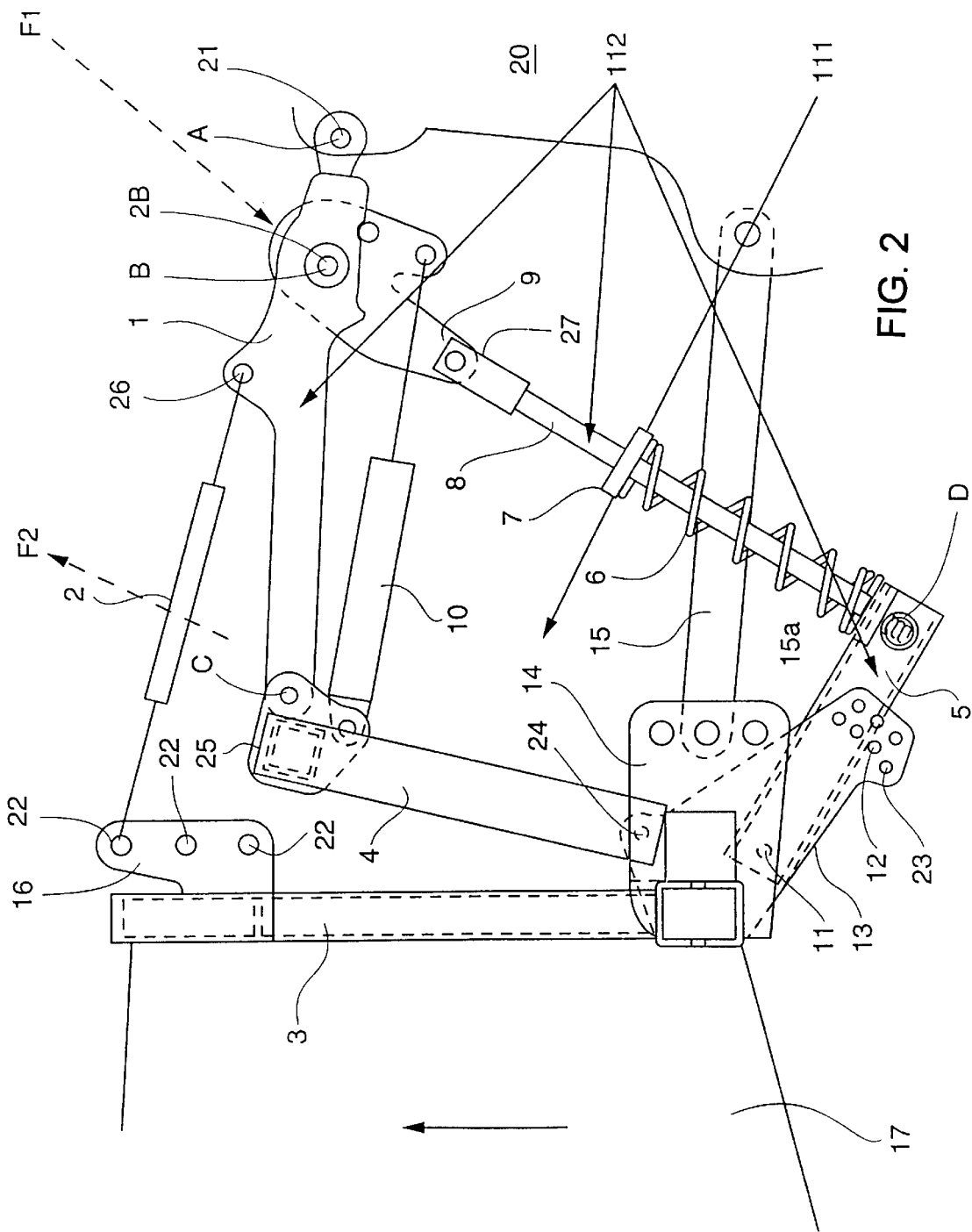
FIG. 2 is a detail side view of a coupling assembly mounted at the front of the implement, and which is coupled with the two lower links and the fixed top link of the three point lifting mechanism at the rear of the tractor.
Figure 3:
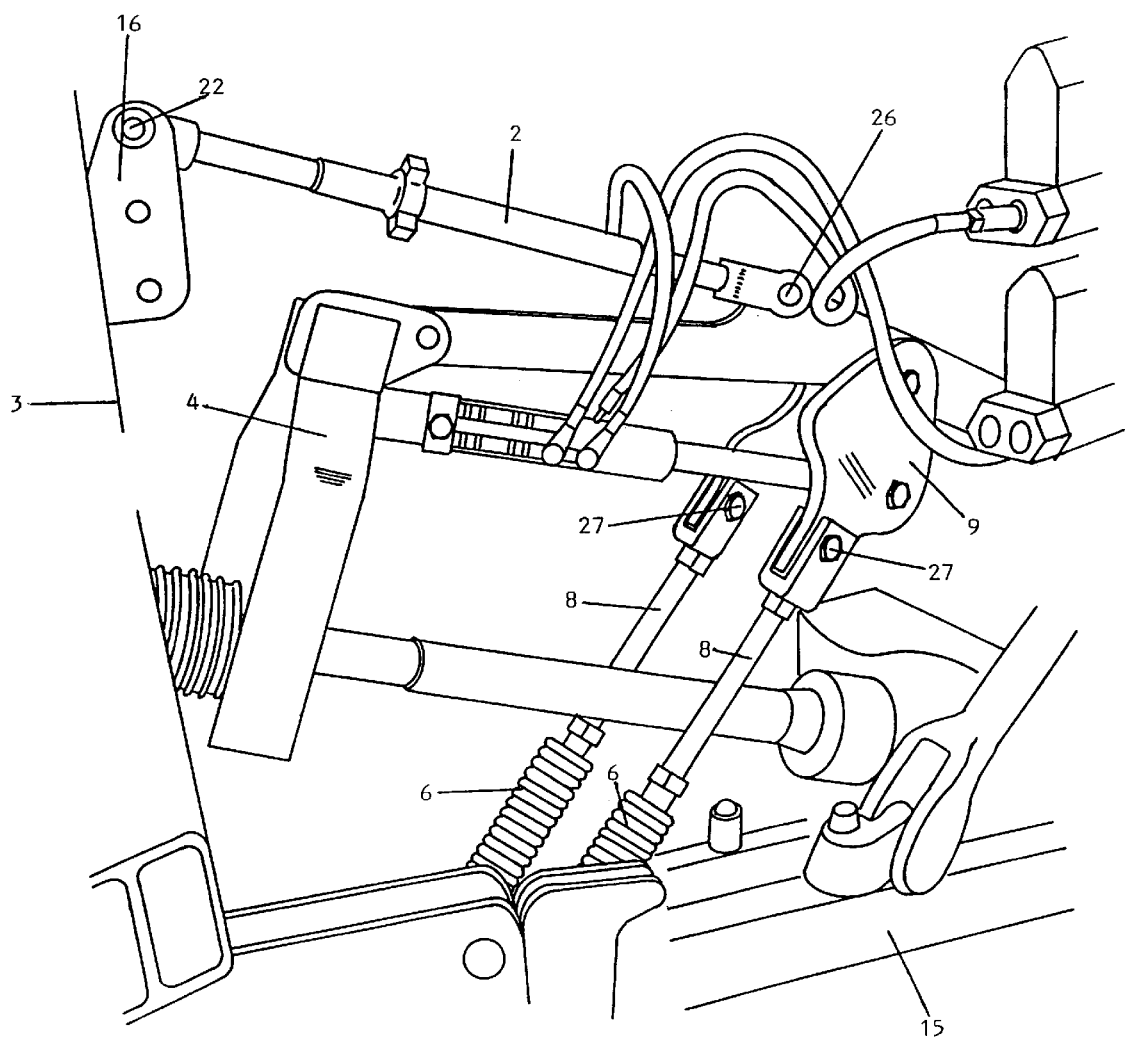
FIG. 3 is a perspective illustration of the front mounting assembly of the implement, and shown in a pressed-down working mode.

Referring now to FIG. 2 of the drawings, there is shown in schematic outline the rear end 20 of a tractor having a pair of lower draft links 15, and a fixed top link 21 to which the front mounting assembly of the implement can be coupled. The main frame of the implement is shown diagrammatically by reference 17, and an upstanding front frame 3 is rigidly assembled with the main frame 17, and is mounted at its lower ends on a pair of laterally spaced mounting brackets 14, each of which can be pivotally connected to a respective one of the lower draft links 15. The upper end of support frame 3 carries a mounting bracket 16, and which is connected indirectly to the top link 21 via an adjustable link 2. The adjustable ground wheels (not shown in FIG. 2) which support the main frame 17 can set any required working depth of the soil working tools carried by the main frame, but the interconnection between top bracket 16 and the top link 21 serves as a means for adjustment of the angle taken up by the main frame 17 relative to the ground being traversed. Coarse adjustment of this angular adjustment can be achieved by connecting the link 2 to any selected one of a set of mounting holes 22 in the bracket 16, whereas fine adjustment can be carried out by telescopic adjustment of the length of the link 2, which may comprise a hydraulic ram, or a turnbuckle. Relative adjustment of the distance between bracket 16 and top link 21 causes relative pivoting about the pivots 15a at the ends of lower drafts link 15.

In addition to the rigid front frame 3, the mounting assembly also includes an actuator rod 8 which is adjustable between an inoperative mode (not shown in FIG. 2) and an operative mode in which it is effective to apply a downward biasing force to the main frame 17. An actuator arm 5 is therefore coupled with the actuator rod 8 and also with the main frame 17 so as to be capable of transmitting the biasing force from the actuator rod as a downward force on the main frame and thereby to the soil working tools. The actuator rod 8 is arranged to be biased by any suitable means, but preferably utilises a compression spring 6 which reacts between a retaining plate 7 which is adjustably mounted on the actuator rod 8 to permit variation in the compression load which the spring 6 can apply, in that the other end of the spring 6 engages with the actuator arm 5, when in the operative mode shown in FIG. 2. The lower end of the rod 8 is slidably received by the actuator arm 5, and is capable of projecting through the actuator arm 5 against the spring biasing of the compression spring 6. The upper end is adjustable between the operative position shown of the rod 8 in FIG. 2, and an inoperative position (not shown) under the action of a hydraulically operated toggle 9 and cylinder 10, as will be described in more detail later.

The actuator arm 5 is pivotally connected to support 13 via a horizontal pivot 11, but its clockwise pivoting about pivot 11 is resisted by a locking pin 12 taken through any selected one of a range of holes 23 formed in a support 13 which is held rigidly in assembly with bracket 14 and the lower end of front frame 3. The brackets 14 are positioned on both sides of the front frame 3, and each bracket is made of two plates with a hole in it. The lower draft links 15 are positioned between the plates, and the bolt is taken through the holes in the plates, and through the draft links.

Therefore, a downward biasing force is applied to actuator arm 5 by the compression spring 6, and which is transmitted to the main frame 17 via locking pin 12 and support 13. Variation in the selection of hole 23 in which locking pin 12 is located, and also variation in the position of reaction plate 7 on the actuator rod 8 can result in variation in the biasing force which can be generated.

The actuator rod 8 and actuator arm 5 form part of a four arm linkage, forming part of the mounting assembly, and the further components of which comprise a generally upwardly extending intermediate support frame 4 which is pivoted at its lower end 24, and which is pivoted at its upper end 25 to lever arm 1, which forms the remaining part of the four arm assembly. The lever arm 1 is pivotally connected at its forward end to the top link 21, and the adjustable link 2 is indirectly coupled with the top link 21 by being connected to the lever arm 1 via pivot 26.

To convert the actuator rod 8 between the operative mode, shown in FIG. 2, and an inoperative mode, the toggle link 9 is pivotally connected to the upper end of actuator rod 8 via pivot 27, and is itself pivotally mounted on a horizontal pivot 28 for adjustment between the operative mode, shown in FIG. 2, and an inoperative mode, under the action of a hydraulic adjusting ram 10.

The components of the coupling/mounting assembly (designated generally by reference 111) at the front end of the implement (components 1, 4, 14, 13, 12, 5, 8, 9) permit the implement to be easily coupled with a standard three point lifting mechanism of a tractor, without need to carry out any modifications or adaptations of the lifting mechanism. Thus, the assembly 111 can be coupled directly to the fixed top link 21 and to the lower links 15 via specially designed top lever arm 1 and via lower mounting brackets 14 respectively.

However, a weight transfer device is incorporated in, or forms a part of the mounting assembly 111, and the components which make-up the weight transfer device are given the common reference 112, in addition to their own references denoting lever arm 1, actuator rod 8 and spring 6, arm 5, and support frame 4.

This mechanism forms part of the mounting assembly, by being coupled with fixed top link 21, but also transmits a net downward force to the main frame 17 (derived from the weight of the tractor) via rod 8 and arm 5, since the downward force exerted on rod 8 is much greater than the upward-force applied to the end C of lever arm 1 to the support frame 4, as will be described in more detail below.

The operating components of the mounting assembly have now been described, and there will now be described a way in which they operate, in the different modes of operation.

The actuator arm 5 can pivot freely about pivot 11, but when the actuator rod 8 is in the operative position, as shown, the spring 6 presses against the arm 5 and urges it in a clockwise direction until its movement is by the locking pin 12. This then stops further pivoting of the actuator arm 5 in the clockwise direction, although it remains free to pivot in an anti-clockwise direction, and against the action of the spring 6. The position of the locking pin 12 can be varied, by choosing an appropriate one of the holes 23, and this will be done primarily to adapt the mounting assembly to different designs of tractor. Also, this allows some coarse adjustment of the compression loading which can be derived from the spring 6. Fine adjustment of the compression loading of the spring 6 can be achieved by moving the reaction plate 7 along the length of the actuator rod 8.

When it is required to apply a downward force to the working tools carried by the main frame 17, the ram 10 is actuated to pivot toggle 9 in a clockwise direction about pivot 28 from the inoperative position (not shown) to the operative position, in which it will be noted the line of action of the actuator rod 8 extends substantially through the pivot 28. In this position of ram 10 and actuator rod 8, the compression spring 6 is fully activated, and presses the implement down on the ground, and this is the position of the implement shown in FIGS. 2 and 3.

To achieve most effective weight transfer from the tractor to the implement, via the mounting assembly, it is desirable to locate the pivoting point B between lever arm 1 and toggle 9 to be as close as possible to pivot point A provided by the top link 21 of the tractor. The lever arm 1 acts as a balance arm, which transfers the major part of the weight load of the rear of the tractor via pivot point B (in view of its short spacing from pivot A), whereas only a small part of this force is taken up by the point C which is the pivotal interconnection between the remote end of lever arm 1 and the top of intermediate support frame 4. Therefore, the major part of the downward load from the tractor e.g. approximately 90%, is transmitted via lever arm 1, pivot 28, toggle 9 and thence to the actuator rod 8, and via now preloaded spring 6 to the actuator arm 5.

The favorable weight transfer from the tractor 101 to the working tools 103 (via the improved front coupling assembly 111 on the implement) is achieved because of the particular arrangement of the weight transfer mechanism 112, which forms part of the coupling assembly 111. Thus, the weight transfer mechanism 112 is formed by the lever arm 1, toggle 9, actuator rod 8 and spring 6, and actuator arm 5. The forward end A of lever arm 1 is connected pivotally to top link 21, and the rear end C of the lever arm 1 is pivoted to the upper end 25 of support frame 4 which forms part of the coupling assembly. In use, part of the weight of the tractor is transmitted via top link 21 to the lever arm 1, and this applies a downward force $F_1$ which passes generally through the axis of pivot B, and which is generally coincident with the axis of rod 8 when in the operative position shown in FIG. 2. An upward reaction force $F_2$ is transmitted from the lever arm 1 via pivot C to the support frame 4, and therefrom to the main frame 17. However, by simple geometry, it will be apparent that the location of the line of action of downward force $F_1$, acting through actuator rod 8, passes approximately through the pivot B, and this is a short lever arm relative to pivot A, whereas there is a much longer pivot arm about pivot A in respect of the upward force $F_2$.

Assuming the distance between pivots A and B to be $L_1$ and between pivots B and C to be $L_2$, then for a given downward component of force $F_1$ acting along rod 8 and upward force $F_2$ acting through pivot C, the following approximate formula will apply:

$$F_1 \times L_1 = F_2 \times (L_1 + L_2)$$

Therefore $F_2$, $=F_1 \times L_1 + L_1 + L_2$

This means that the upward force $F_2$ is much smaller than the downward force $F_1$, and therefore the net downward force applied to the main frame 17 (via the weight transfer from the tractor through the front coupling assembly 111, and particularly the weight transfer mechanism 112 thereof) is a substantial proportion of the force $F_1$. In a typical arrangement, as represented by the geometry of FIG. 2, the net downward force ($F_1-F_2$) which is applied to the main frame 17 may be about 80% of the axial thrust applied to rod 8, spring 6, arm 5 and to bracket 13. This net downward force is then transmitted from the main frame 17, directly or indirectly, to the working tools 103 so as to press them downwardly into the ground and to apply a constant downward biasing force, which helps to maintain a substantially constant depth of penetration during forward travel of the tractor 101 and implement 100, despite possible undulation in the ground surface, and/or variation in ground resistance.

It should be appreciated that the formula which is quoted above is an approximation only, since the line of action of rod 8 does not intersect the line joining pivots A and C strictly at right angles.

Figure 4:
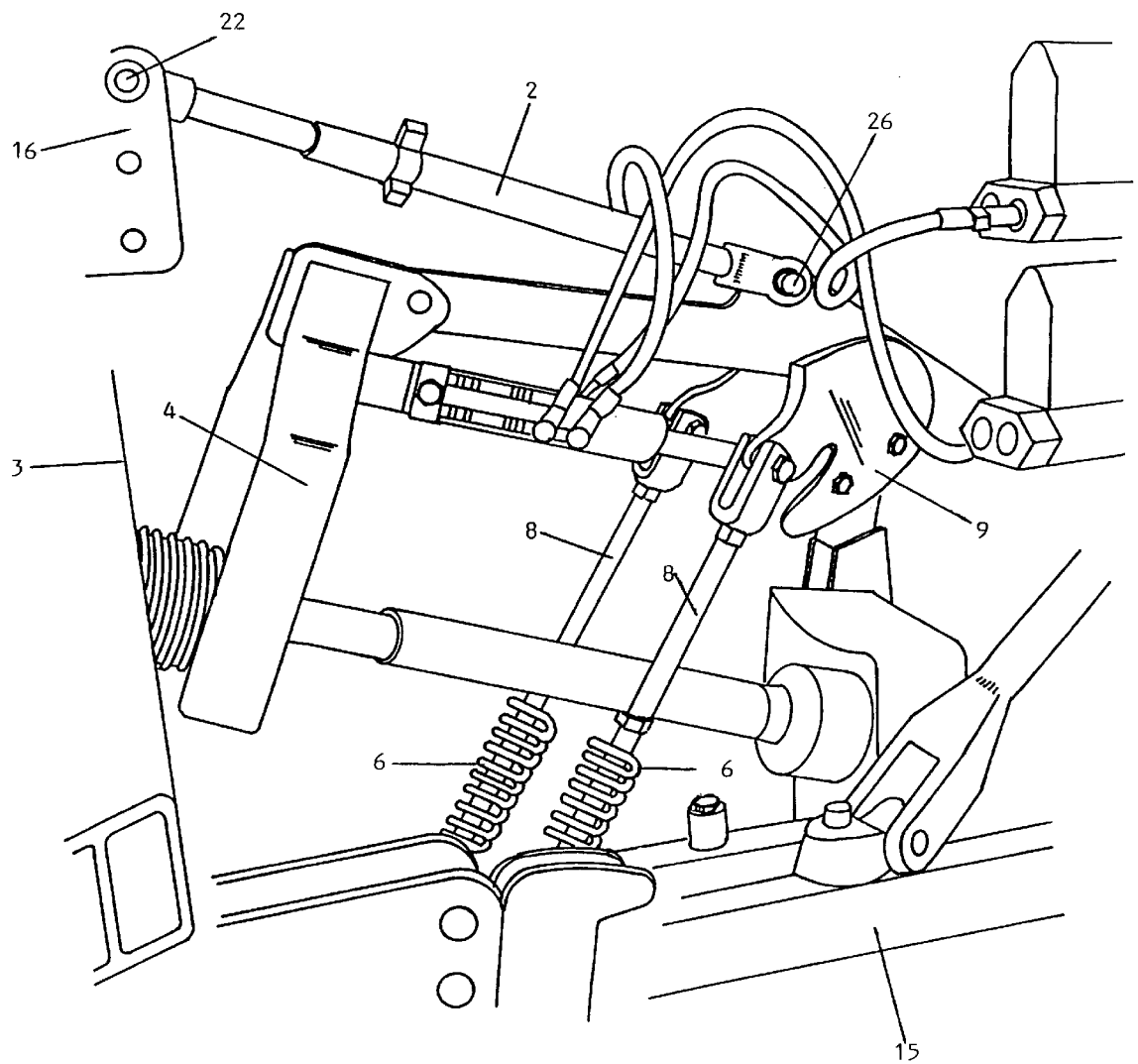
FIG. 4 is a view, similar to FIG. 3, but showing the positions taken by the components in an unloaded position.
Figure 5:
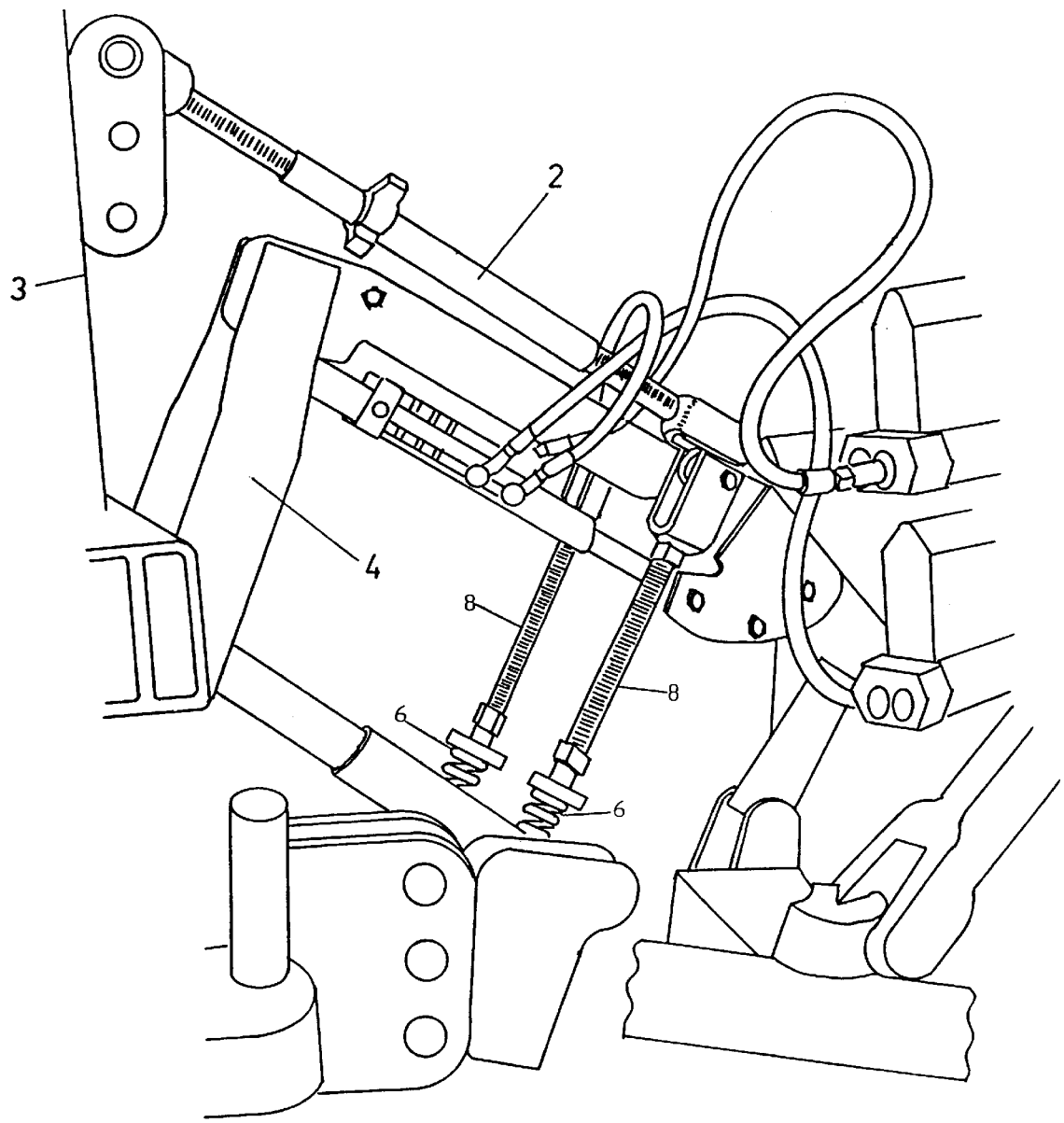
FIG. 5 is a view, similar to FIGS. 3 and 4, showing the positions taken up by the components of the mounting assembly when the entire implement is lifted to an inoperative position by the lower draft links of the lifting mechanism of the tractor.

When it is required to lift the implement, the actuating force of ram 10 is released so that toggle 9 can pivot anti-clockwise, and the compression in the spring 6 is then relaxed, and this movement of the toggle 9 and the actuator rod 8 can take place freely without obstructing the movement of the mechanism. FIG. 4 shows the position of the components which is taken up when the pressure in the springs 6 is released. FIG. 5 shows the lifted position of the implement which is taken up upon raising of the lower draft links 15. However, when it is required to lower the implement to the ground again, the actuator arm 5 can pivot freely. This is an important aspect of the mounting assembly of the invention, because when the lower draft links 15 are lifted, the distance between the point B (pivot 28 connecting together toggle 9 and lever arm 1) and point D (the point of action between the compression spring 6 when loaded, and the actuator arm 5) is shortened, and conversely the distance between points B and D is lengthened when the draft links 15 are lowered. The illustrated arrangement readily permits this movement, whereas it would be almost impossible to achieve this desired result by use of a spring located in a fixed position, which would have to be so voluminous to be able to take both the substantial movement, and also to be able to exert the substantial force that is required.

During normal operation i.e. with the implement being towed behind the tractor and adjusted to an operative position for seed drilling, the lower draft links 15 will normally be arranged to be capable of "floating" so that the implement can follow the ground surface. In this working position, the weight of the implement acts on the ground, but by means of the spring loading provided within the mounting assembly (when adjusted to the operative mode shown in FIG. 2), an additional downward force is transferred from the tractor to the implement and via this mounting assembly, to stabilise the implement and thereby seek to maintain suitable depth of the grubber tines and the seed drills, despite undulation or hardness in the ground surface. This provides a significant advantage of promoting more even germination of the seeds, and avoids failure of the seeds to germinate which can arise with existing drilling machines, when the instantaneous drilling depth ever becomes much too low.

Figure 7:
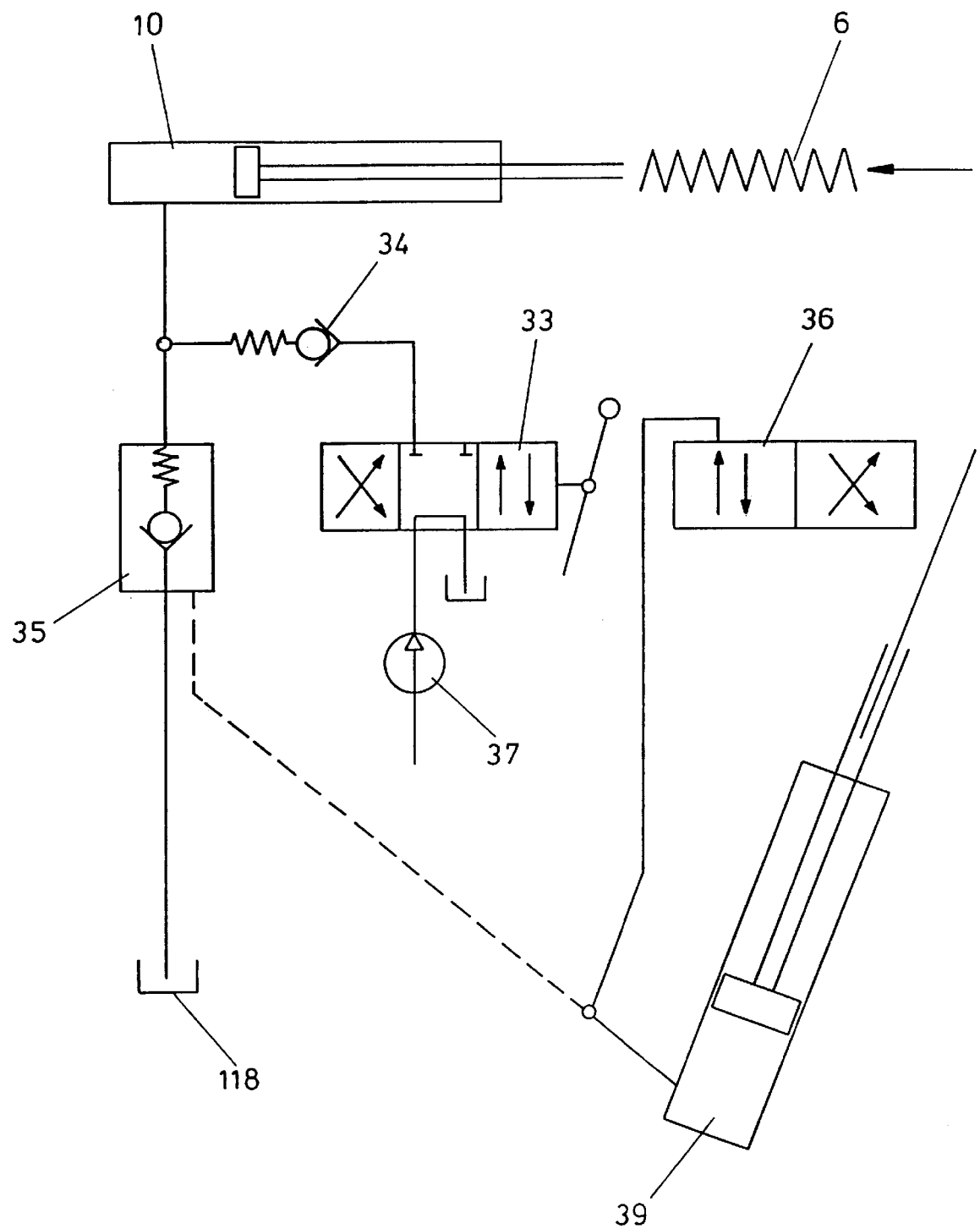
FIG. 7 is a schematic hydraulic diagram of one example of a hydraulic actuator circuit for adjusting the mounting assembly between different modes of operation.

A hydraulic actuator circuit for controlling the adjustment of the mounting assembly is shown in FIG. 7, and this is a schematic illustration and by way of example only. This shows schematically the compression spring 6 and actuator ram 10, and how they are incorporated within a hydraulic control circuit.

The hydraulic circuit shown in FIG. 7 includes a slide valve 33 which is manually operable to cause pressurisation of the ram 10. The circuit includes a pressure supply 37, and check valves 34 and 35 associated with ram 10, and the circuit also includes a lifting cylinder 39 and operating slide valve 36, which are provided on the tractor and which are operative in order to lift the lower draft links 15 when required, in order to lift the implement.

Figure 6:
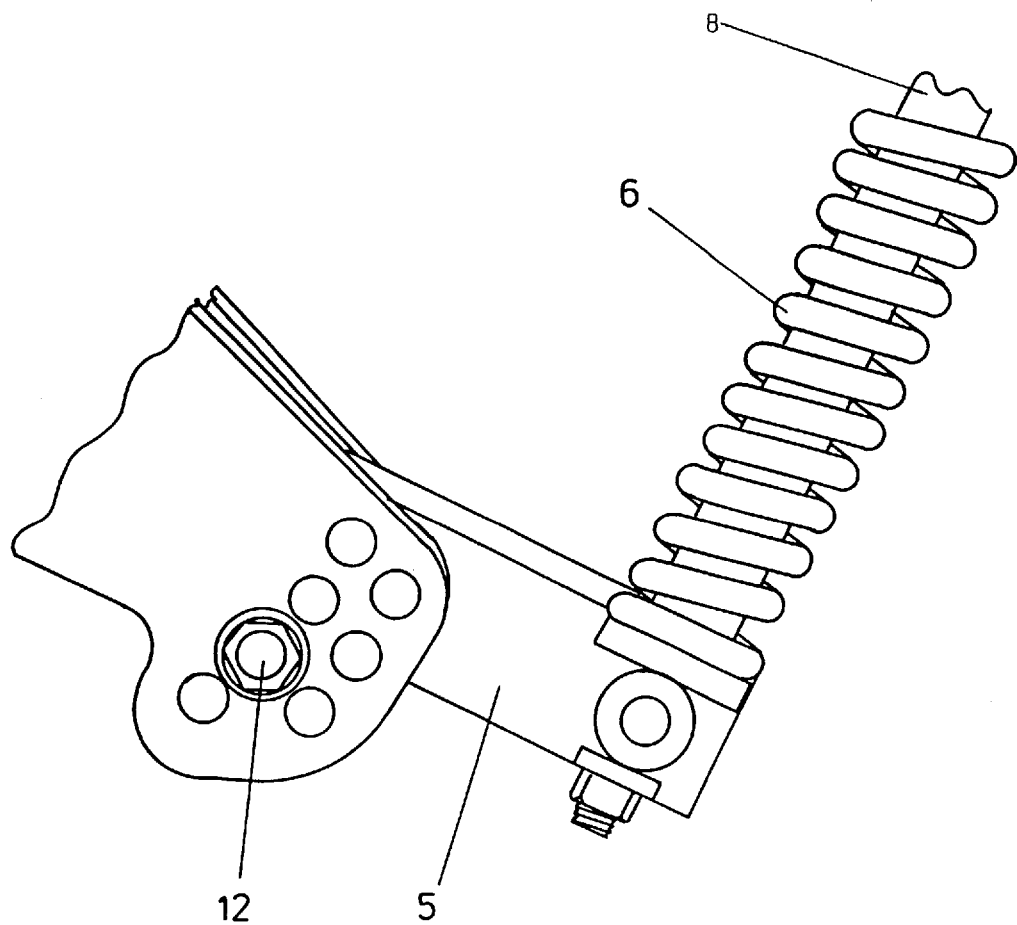
FIG. 6 is a detailed side view showing part of a spring loaded component of the mounting assembly, for applying a downward biasing force to the main frame of the implement which applies a continuous downward force to the seed drills of the implement.

Therefore, when it is required to make the spring 6 active i.e. to apply the downward biasing force to the actuator arm 5, the valve 33 is operated which allows pressurised oil from the pressure source 37 to pass to one side of the ram 10, and which rotates the toggle 9 to the operative mode shown in FIG. 6, whereby spring 6 applies downward biasing force to the actuator arm 5. The check valves 34 and 35 maintain the ram 10 in the pressurised position. Then, if it is required to lift the implement, tractor valve 36 is operated which causes pressurisation of lifting cylinder 39, which raises the draft links 15. However, in addition to pressurising the lifting cylinder 39, the pressure supply also passes to the check valve 35, and causes it to open, and thereby allows the ram 10 to depressurise, and toggle 9 then is able to return to the inoperative position (under the action of compression spring 6), and which removes the loading on compression spring 6. This release of the compression spring 6, and movement of the ram 10 back to a free position, normally occurs before the implement is lifted.

The ram 10 illustrated in FIG. 7 is a single acting cylinder, but this is for illustration purposes only, and a double acting cylinder could readily be employed if required.

A second embodiment of the invention will now be described in detail, by way of example only, with reference to FIGS. 8 to 10, and which shows a preferred alternative design of weight transfer mechanism, incorporated in the front mounting assembly of the implement. Effectively, this alternative embodiment replaces the actuator rod 8 and spring 6, and its cylinder operated toggle 9, 10 by a hydraulically operated cylinder. Apart from that, the geometry of the means by which weight is transferred from the tractor to the main frame, and thence to the ground working tools is generally similar. Parts which correspond with those which have already been described with reference to the first embodiment are given the same reference numerals, and will not be described in detail again.

The main modifications therefore comprise replacement of actuator rod 8, reaction plate 7 and compression spring 6 by a telescopically adjustable hydraulic cylinder 200, which reacts between an upper pivot point 201 carried by a pivotable toggle 202 mounted on the lever arm 1 at a position much closer to forward pivot end A than rear pivot end C of the lever arm 1, in generally similar manner to the first embodiment as shown in FIG. 2. The lower end of the cylinder 200 is coupled with the actuator arm 5 via bottom pivot D. An accumulator 203 is mounted at any convenient point on the mounting assembly, and in the illustrated arrangement is secured to the upstanding support frame 4.

Figure 8:
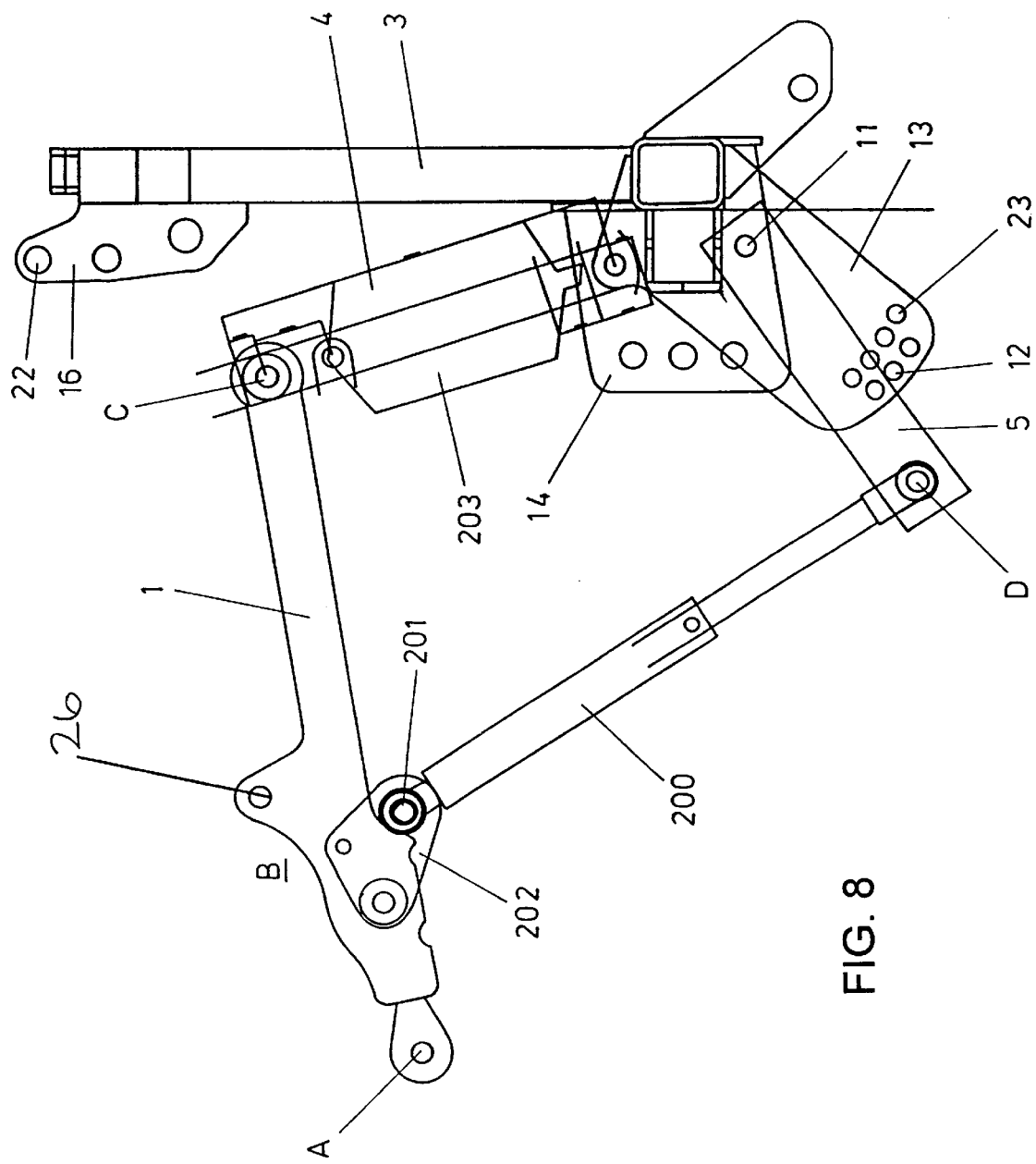
FIG. 8 is a detailed side view of part of a second embodiment of implement according to the invention, and having an alternative arrangement of weight transfer device incorporated within the front mounting assembly of the implement, to be coupled with a standard three point lifting mechanism of a tractor.
Figure 9:
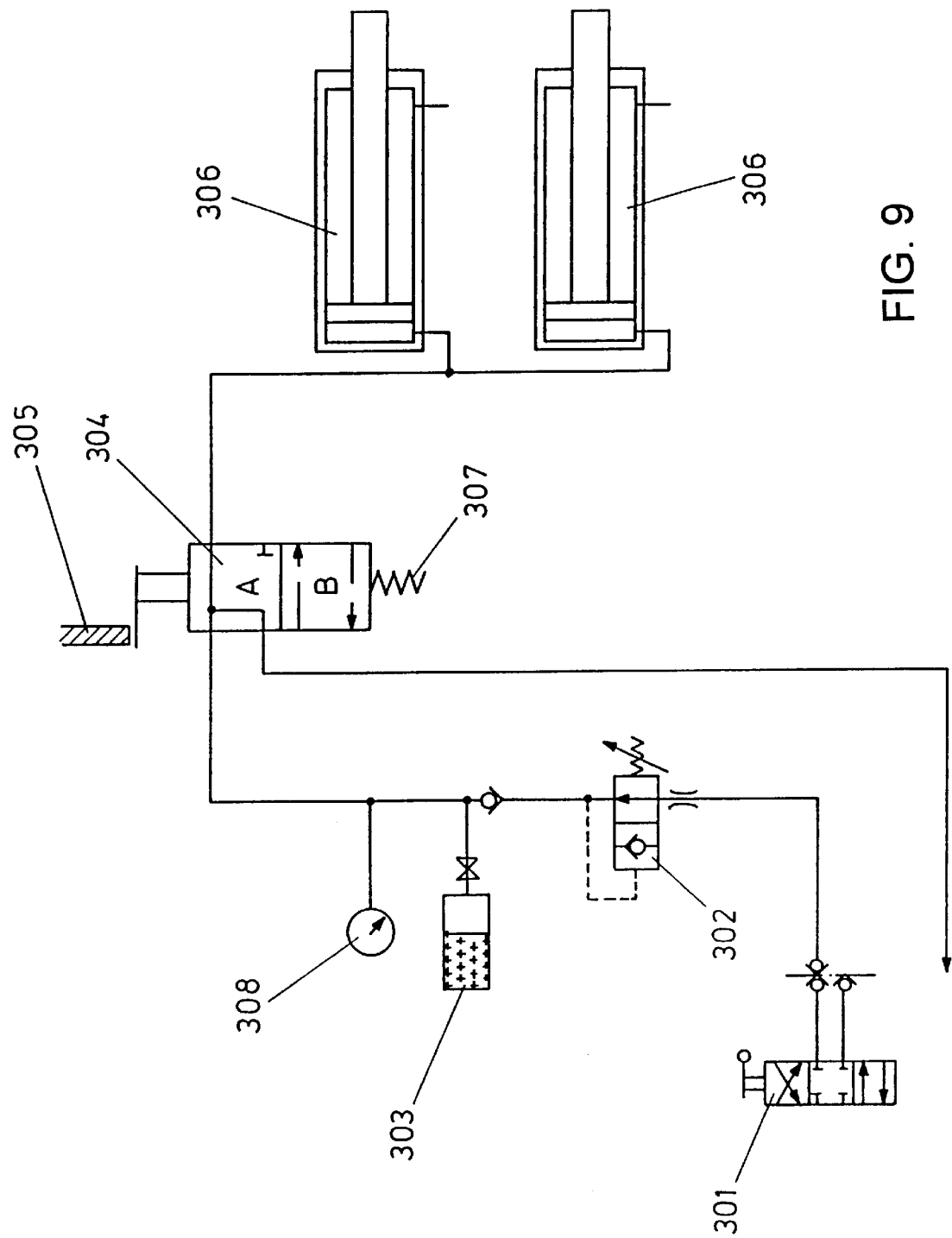
FIG. 9 is a hydraulic circuit diagram of the hydraulically moving components of the weight transfer mechanism shown in FIG. 8.

The hydraulic operating circuit which controls the operation of the hydraulically adjustable components of the weight transfer mechanism of FIG. 8 is shown in FIG. 9, and will now be described. The hydraulic control circuit is connected to a valve 301 provided on the tractor, and the circuit includes an adjustable pressure regulator 302, an accumulator cylinder 303 (forming the accumulator 203 of FIG. 8), a control valve 304, an actuator knob 305, and rams 306 forming the weight transfer cylinders 200 of FIG. 8.

The control valve 304 has positions A, and B, as shown, and a compression spring 307 normally maintains the valve in position B during operation. When the operator has positioned the implement in the required working position, and wishes to transfer weight from the tractor to the working tools of the implement, then the valve 301 is operated, which allows pressure oil to pass through the adjustable pressure regulator 302 and to fill the accumulator cylinder 303. The pressure oil also passes through the valve 304 when in the position B, and into the pressure chambers of the rams 306 so that they exert the required pushing force, reacting between lever arm 1 and actuator arm 5. When the set pressure value is reached, the valve shuts-off the oil supply. The operator can read on a pressure gauge 308 that the pressure is stabilised, and can then shut-off the valve 301.

When the ground surface which is being traversed is undulating, the implement will move up and down relative to the tractor, and the weight transfer mechanism is automatically adjusted. The rams 306 therefore need to extend and to retract accordingly, to maintain the required force. This is made possible by the accumulator 303 which can accommodate the varying oil volumes in the chambers of the rams 306. When the ground working operation e.g. seed drilling is completed, and the implement is going to be lifted out from the ground to a transport position, it is necessary for the rams 306 no longer to apply the downward biasing force. Therefore, actuating knob 305 is provided, which is operated to push the valve 304 to take-up the position A, and which allows the oil pressure to return to the tank.

It is not shown in detail how the knob 305 and the valve 304 are arranged, but the distance between the points P1 and P2 are reduced when the implement is lifted out of the ground. Once the pressure is relieved from the circuit, it is not applied again until the operator returns the implement to the working position and again operates the tractor valve 301.

In both embodiments of the invention, when required, i.e. when the actuator rod 8 of the first embodiment is actuated to the operative position of FIG. 2, or when the rams 306 are activated by operation of valve 301, a continuous downward biasing force is applied to the ground working tools via the weight transfer mechanism which is incorporated as a component part of the front mounting assembly of the implement, and to the main frame. During operation, if an upward force is generated which tries to lift the implement, the weight transfer mechanism resists such tendency for upward movement. An upward force can be generated when the soil which is being worked becomes so hard that the weight of the implement alone is not sufficient to keep the implement in the required position, and thereby the working tools at the required working depth, but the continuous downward biasing force achieved via weight transfer from the tractor resists any such tendency for upward movement of the implement.

It should be borne in mind that the usual lower draft links (15) of the lifting mechanism of the tractor normally are only capable of carrying out a lifting operation, or can also be set in a "floating mode", but are not normally capable of applying a downward biasing force.

The two preferred embodiments of the invention provide weight transfer from the tractor which opposes any tendency for upward movement of the implement, and thereby maintains the implement at the required height above the ground, and maintains the working tools at the correct working depth during forward travel of the tractor/implement combination.

The front mounting assembly of the implement is particularly useful for use with different designs of lifting mechanisms provided on agricultural tractors. Thus, the fastening brackets on tractors for the top link can be of varying design. By providing the specially designed top link (lever arm 1) which forms a component part of the front mounting assembly of the implement itself, plus the fitting of the weight transfer device (rod 8 and spring 6, or cylinders 200) to the special top link, it is possible to couple the implement to the lower draft links and to the top link of the lifting mechanisms of most designs of tractors, without further adaptation or modification of the lifting mechanism.

Figure 10:
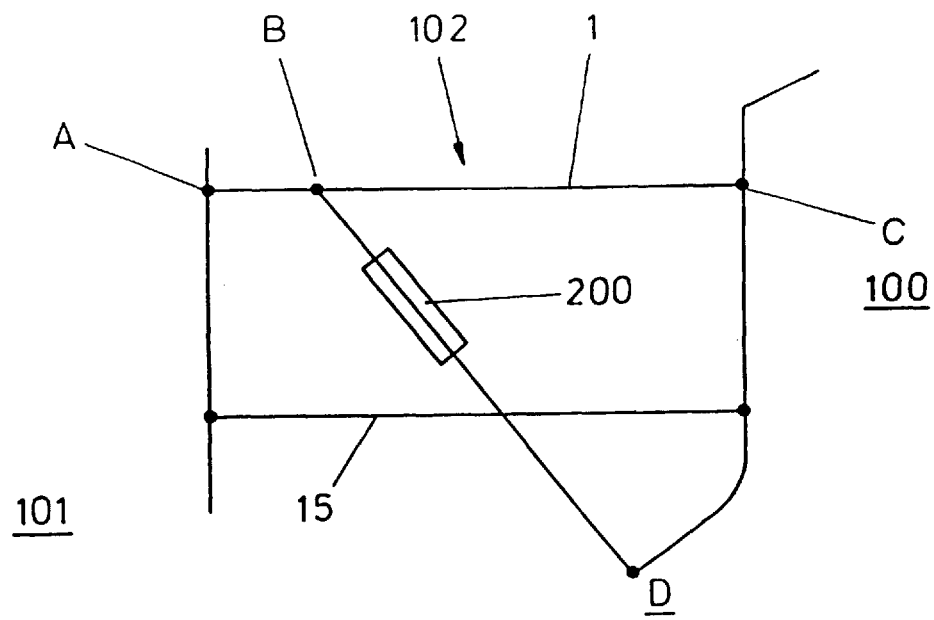
FIG. 10 is a diagrammatic representation of the means by which part of the weight of the tractor is transferred via the weight transfer mechanism to the main frame of the implement, and therefrom to the ground working tools.

FIG. 10 is a schematic illustration of the weight transfer/ mounting assembly of the second embodiment, and the means whereby this co-operates with the top link and the lower draft links of the lifting mechanism of the tractor. It will be appreciated that the geometry of the arrangement shown in FIG. 10 will be generally similar in the first embodiment, where the line of action of actuator rod 8 and spring 6 is generally similar to that of the cylinders 200.

Figure 11:
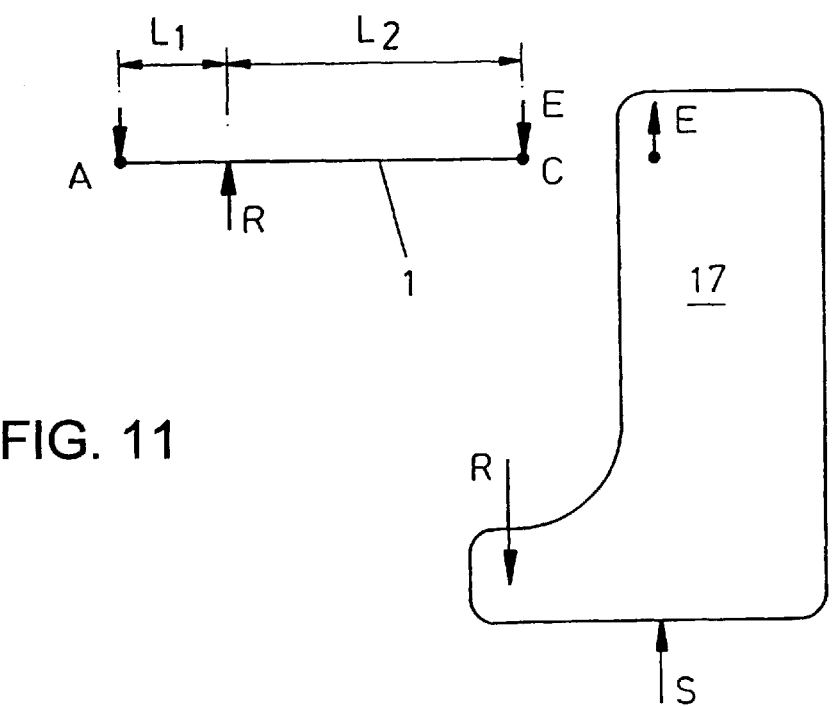
FIG. 11 is a schematic illustration of the forces applied through the components of the frame during weight transfer.

FIG. 11 is a simplified representation of the upward and downward forces which are generated, during transfer of weight from the tractor to the main frame, via the weight transfer mechanism. Assuming generation of compressive load in cylinders 200, an upward force R is transmitted to the lever arm 1 at a distance $L_1$ from pivot A, and this is resisted by a downward force E at the end C of the lever arm 1. Opposite forces are then applied to the frame 17, i.e. downward force R derived from the compressive load in the cylinders 200 applied to pivot point D, and an upward force E which is applied to the main frame 17 via pivot C and to the support frame 4. However, by simple mathematics, the following formula is derived:

$$E(L_1+L_2)=R \times L_1;$$

Therefore $E = R \times L_1 \div L_1 + L_2$

It should be understood that, for simplicity, it is assumed that the forces of interest are vertical forces only, and the weight of the components is not take into account.

The net downward force applied to the frame 17 therefore equals R minus E, and therefore an additional force S is applied to push the ground working tools downwardly, in which S equals R minus E.

While various embodiments of the present invention have been described in detail, it is apparent that modifications and adaptations of those embodiments will occur to those skilled in the art. It is to be expressly understood, however, that such modifications and adaptations are within the scope of the present invention as set forth in the following claims.

What is claimed is:

1. A towable agricultural implement having a set of ground-working tools which are required to penetrate and to be pulled through the ground at a controllable depth, said implement comprising:

a main frame on which said tools are mounted;

a mounting assembly at a forward end of the main frame and adapted to be mounted on a lifting mechanism of a propelling vehicle, said lifting mechanism comprising a fixed top link and a pair of lower links which are adjustable upwardly and downwardly in order to control the height of a forward end of the implement, and said mounting assembly comprising a pair of mounting brackets mounted on the main frame and engageable each with a respective one of said lower links of the lifting mechanism, and an upstanding frame; and a weight transfer mechanism which forms part of said mounting assembly and which is operative to transfer part of the weight of the propelling vehicle to said main frame in order to increase downward loading applied to the groundworking tools:

characterized in that the weight transfer mechanism comprises:

i) a lever arm having one end which is adapted to be coupled with said top link of the lifting mechanism, and an opposite end which is supported by said upstanding frame of said mounting assembly;

ii) a weight transfer device which is coupled at its lower end with said main frame and at its upper end with said lever arm so as to have a line of action passing through the lever arm at a location closer to said one end than to said opposite end of the lever arm, whereby a downward force $F_1$ applied through the weight transfer device, and derived from the weight of the propelling vehicle, is much greater than an upward force $F_2$ applied at said opposite end of the lever arm, so that a net downward force ($F_1-F_2$) is transferred to the main frame in order to apply a downward biasing force to the ground working tools, wherein a support frame is pivotally mounted at its lower end on the main frame and includes an adjuster device which is operative to vary pivotal adjustment of the main frame relative to the support frame in order to adjust the attitude of the main frame.

2. The implement according to claim 1, in which said adjuster device is arranged to act between said lever arm and a mounting bracket on an upstanding part of the main frame.

3. The implement according to claim 1, in which the weight transfer device is mounted at its lower end on an actuator arm which is pivotally mounted on said main frame.

4. The implement according to claim 3, including a locking pin which defines a limit to downward pivoting of said actuator arm, said pin being adjustable between different positions to vary the downward limiting position.

5. The implement according to claim 1, in which the weight transfer device comprises a spring-loaded actuator rod.

6. The implement according to claim 5, in which the actuator rod is adjustable between an inoperative position and an operative position under the action of a power-operated toggle linkage.

7. The implement according to claim 6, in which the toggle linkage is operable by a cylinder acting between the toggle linkage and a connection to said support frame.

8. The implement according to claim 1 in the form of a direct drilling implement, in which the ground-working tools are seed drills.

9. The implement according to claim 8, in which the seed drills are carried by a secondary frame which is adjustably mounted on the main frame.

10. The implement according to claim 1, in which the weight transfer device comprises a hydraulic cylinder.

11. The implement according to claim 10, in which a hydraulic control circuit controls the operation of the cylinder via a control valve, said circuit including an accumulator.

* * * * *